Patented Jan. 6, 1925.

1,521,720

UNITED STATES PATENT OFFICE.

HERBERT SKELLON, OF MIDDLETON, ENGLAND, ASSIGNOR OF TWO-THIRDS TO TOM HARTLEY ROBERTS, OF SURREY, ENGLAND, AND HUBERT BRYAN RANKIN CLARKE, OF RADLETT HERTS, ENGLAND.

VULCANIZATION OF RUBBER.

No Drawing.     Application filed March 26, 1923. Serial No. 627,879.

*To all whom it may concern:*

Be it known that I, HERBERT SKELLON, a subject of the King of Great Britain and Ireland, and resident of Middleton, in the county of Lancaster, England, have invented certain new and useful Improvements Relating to the Vulcanization of Rubber, of which the following is a specification.

This invention has for its object to provide for the more rapid curing or vulcanization of rubber without in any material way affecting the properties of the finished product.

The invention comprises the incorporation with the rubber mixing prior to curing or heat treatment of a material formed by the reaction of anhydrous zinc sulphate with ammonia with the addition, if not already present in the mixing, of free zinc oxide.

In one convenient application of my invention, I incorporate with the rubber mixing prior to curing or heat treatment from 1% upwards (of the weight of rubber in the mixing) of penta-amino zinc sulphate ($Zn.SO_4.5NH_3$) which is a double compound formed between anhydrous zinc sulphate and dry ammonia with an approximately equal percentage of zinc oxide. In the subsequent curing operation, the said mixture of compounds accelerates the vulcanizing process without materially affecting the product obtained.

Some of the basic zinc sulphates contain a high percentage of zinc oxide and can be used without any further addition of zinc oxide to the mixture.

As an example of a suitable mixing:—
An ordinary rubber mixing containing 48% rubber, 49% fillers and 3% sulphur would be cured in about 90 minutes at 40 lbs. steam pressure. If, however, from 1% to 2% (of the weight of rubber in the mixing) of equal proportions of penta-amino zinc sulphate and zinc oxide be added to the mixing, the time of cure is reduced to about 20 minutes.

I do not limit myself to any particular rubber mixing or proportion of accelerator but may vary the same to suit requirements.

I claim:—

1. In the vulcanization of rubber, the incorporation with the rubber mixing prior to curing or heat treatment, of a material formed by the reaction of anhydrous zinc sulphate with ammonia, with the addition, if not already present in the mixing, of free zinc oxide, as set forth.

2. As an accelerator in the vulcanization of india-rubber, a material formed by the reaction of anhydrous zinc sulphate with ammonia, as set forth.

3. As an accelerator in the vulcanization of india-rubber, a material formed of equal proportions by weight of penta-amino zinc and zinc oxide, as set forth.

In testimony whereof I have signed my name to this specification.

HERBERT SKELLON.